US011919229B2

(12) United States Patent
Moran

(10) Patent No.: US 11,919,229 B2
(45) Date of Patent: Mar. 5, 2024

(54) LARGE AREA PROJECTION MICRO STEREOLITHOGRAPHY

(71) Applicant: LAWRENCE LIVERMORE NATIONAL SECURITY, LLC, Livermore, CA (US)

(72) Inventor: Bryan D. Moran, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 328 days.

(21) Appl. No.: 14/688,187

(22) Filed: Apr. 16, 2015

(65) Prior Publication Data

US 2016/0303797 A1 Oct. 20, 2016

(51) Int. Cl.
| | |
|---|---|
| *B29C 64/135* | (2017.01) |
| *B29L 9/00* | (2006.01) |
| *B33Y 10/00* | (2015.01) |
| *B33Y 30/00* | (2015.01) |
| *B33Y 50/00* | (2015.01) |

(52) U.S. Cl.
CPC ......... *B29C 64/135* (2017.08); *B29L 2009/00* (2013.01); *B33Y 10/00* (2014.12); *B33Y 30/00* (2014.12); *B33Y 50/00* (2014.12)

(58) Field of Classification Search
CPC . B29C 67/0066; B29C 64/386; B29C 64/135; B33Y 10/00; B33Y 30/00; B33Y 50/00; B29L 2009/00
See application file for complete search history.

(56) References Cited

U.S. PATENT DOCUMENTS

| | | | |
|---|---|---|---|
| 4,575,330 A | 3/1986 | Hull | |
| 4,834,540 A * | 5/1989 | Totsuka | G01R 31/308 250/491.1 |
| 5,059,021 A | 10/1991 | Spence et al. | |
| 5,902,537 A | 5/1999 | Almquist et al. | |
| 5,976,448 A | 11/1999 | Haruta et al. | |
| 6,200,646 B1 | 3/2001 | Neckers et al. | |
| 6,246,706 B1 * | 6/2001 | Kafka | G03F 7/704 372/13 |

(Continued)

FOREIGN PATENT DOCUMENTS

| | | |
|---|---|---|
| EP | 2646223 B1 | 6/2017 |
| EP | 3708369 A1 | 9/2020 |

(Continued)

OTHER PUBLICATIONS

Zhou et al. "Additive manufacturing based on optimized mask video projection for improved accuracy and resolution" Journal of Manufacturing Processes 14 (2012) 107-118.*

(Continued)

*Primary Examiner* — Robert S Walters, Jr.
(74) *Attorney, Agent, or Firm* — HARNESS, DICKEY & PIERCE, P.L.C.

(57) ABSTRACT

A large area projection micro stereolithography (LAPuSL) system uses an addressable spatial light modulator (SLM) in coordination with an optical scanning system to make very large stereolithographically produced objects. The SLM is imaged onto a photosensitive material with an optical system that has the ability to scan the image over a large area and speedily manufacture large scale complex three dimensional components with micro scale features.

3 Claims, 11 Drawing Sheets

(56) References Cited

U.S. PATENT DOCUMENTS

| | | |
|---|---|---|
| 6,505,089 B1 | 1/2003 | Yang et al. |
| 6,833,234 B1 | 12/2004 | Bloomstein et al. |
| 7,088,432 B2 | 8/2006 | Zhang |
| 8,636,496 B2 | 1/2014 | Das et al. |
| 8,660,825 B2 | 2/2014 | Kumar |
| 8,666,142 B2 | 3/2014 | Shkolnik et al. |
| 10,611,093 B2 | 4/2020 | FrantzDale et al. |
| 10,723,078 B2 | 7/2020 | Cooper |
| 11,192,294 B2 | 12/2021 | Cooper et al. |
| 11,196,876 B2 | 12/2021 | Chen et al. |
| 11,390,036 B2 | 7/2022 | Winter |
| 2003/0173713 A1* | 9/2003 | Huang ................ B29C 64/165 264/401 |
| 2005/0007671 A1* | 1/2005 | Onvlee ............. G02B 26/0841 359/626 |
| 2007/0075460 A1 | 4/2007 | Wahlsgtrom et al. |
| 2008/0223721 A1 | 9/2008 | Cohen et al. |
| 2010/0125356 A1 | 5/2010 | Shkolnik et al. |
| 2011/0033887 A1 | 2/2011 | Fang et al. |
| 2011/0259862 A1* | 10/2011 | Scott ...................... B33Y 30/00 219/121.73 |
| 2012/0251829 A1 | 10/2012 | Xu et al. |
| 2013/0171431 A1 | 7/2013 | Swartz et al. |
| 2014/0081190 A1 | 3/2014 | Summit et al. |
| 2014/0353848 A1 | 12/2014 | Park et al. |
| 2014/0353878 A1 | 12/2014 | Driessen et al. |
| 2015/0100149 A1 | 4/2015 | Coeck et al. |
| 2016/0033877 A1 | 2/2016 | Smilde et al. |
| 2016/0303797 A1 | 10/2016 | Moran |
| 2016/0311160 A1 | 10/2016 | Nam et al. |
| 2017/0136708 A1 | 5/2017 | Das et al. |
| 2017/0355147 A1 | 12/2017 | Buller et al. |
| 2018/0141268 A1 | 5/2018 | Holt |
| 2018/0207887 A1 | 7/2018 | Hsu |
| 2018/0215093 A1 | 8/2018 | Chimmalgi |
| 2018/0341184 A1 | 11/2018 | Hundley et al. |
| 2018/0370148 A1 | 12/2018 | Sekine et al. |
| 2019/0053883 A1 | 2/2019 | Sun et al. |
| 2019/0160465 A1 | 5/2019 | Toner et al. |
| 2019/0329494 A1 | 10/2019 | Linnell et al. |
| 2019/0358902 A1 | 11/2019 | Slaczka et al. |
| 2019/0366630 A1 | 12/2019 | Oikonomopoulos et al. |
| 2020/0001533 A1 | 1/2020 | Packirisamy et al. |
| 2020/0122404 A1 | 4/2020 | Roblin et al. |
| 2020/0215760 A1 | 7/2020 | Wijn et al. |
| 2020/0223135 A1 | 7/2020 | Shutzberg et al. |
| 2020/0282640 A1 | 9/2020 | John |
| 2020/0292415 A1 | 9/2020 | Goldman et al. |
| 2021/0078251 A1 | 3/2021 | Damiano et al. |

FOREIGN PATENT DOCUMENTS

| | | |
|---|---|---|
| WO | 2017/085470 A1 | 5/2017 |
| WO | 2019/028215 A1 | 2/2019 |

OTHER PUBLICATIONS

Zheng et al., "Ultralight, Ultrastiff Mechanical Metamaterials," Science (www.sciencemag.org), vol. 344, No. 6190, 2014, pp. 1373-1377.

International Search Report and Written Opinion for PCT/US16/020971, corresponding to U.S. Appl. No. 14/688,187, 14 pages.

International Search Report and Written Opinion for PCT/US2022/026194, 12 pages.

International Search Report and Written Opinion for PCT/US2022/026196, 12 pages.

International Search Report and Written Opinion for PCT/US2022/026187, 13 pages.

\* cited by examiner

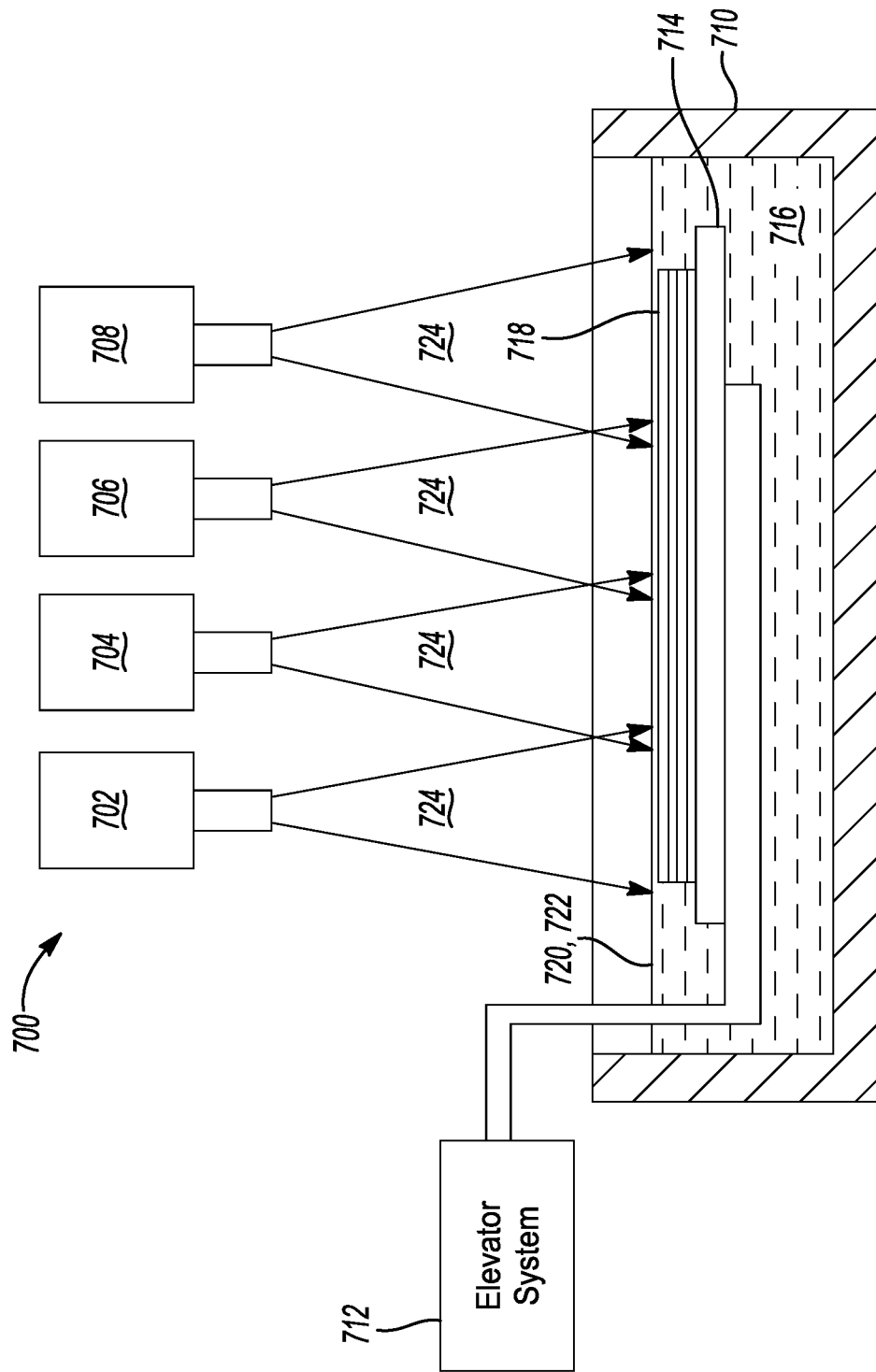

LARGE AREA PROJECTION MICRO STEREOLITHOGRAPHY

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present application relates to additive manufacturing and more particularly to large area projection micro stereolithography.

2. State of Technology

This section provides background information related to the present disclosure which is not necessarily prior art.

U.S. Pat. No. 4,575,330 to Charles W. Hull for apparatus for production of three-dimensional objects by stereolithography issued May 11, 1986 provides the state of technology information reproduced below.

It is common practice in the production of plastic parts and the like to first design such a part and then painstakingly produce a prototype of the part, all involving considerable time, effort and expense. The design is then reviewed and, oftentimes, the laborious process is again and again repeated until the design has been optimized. After design optimization, the next step is production. Most production plastic parts are injection molded. Since the design time and tooling costs are very high, plastic parts are usually only practical in high volume production. While other processes are available for the production of plastic parts, including direct machine work, vacuum-forming and direct forming, such methods are typically only cost effective for short run production, and the parts produced are usually inferior in quality to molded parts.

In recent years, very sophisticated techniques have been developed for generating three-dimensional objects within a fluid medium which is selectively cured by beams of radiation brought to selective focus at prescribed intersection points within the three-dimensional volume of the fluid medium. Typical of such three-dimensional systems are those described in U.S. Pat. Nos. 4,041,476; 4,078,229; 4,238,840 and 4,288,861. All of these systems rely upon the buildup of synergistic energization at selected points deep within the fluid volume, to the exclusion of all other points in the fluid volume, using a variety of elaborate multibeam techniques. In this regard, the various approaches described in the prior art include the use of a pair of electromagnetic radiation beams directed to intersect at specified coordinates, wherein the various beams may be of the same or differing wavelengths, or where beams are used sequentially to intersect the same points rather than simultaneously, but in all cases only the beam intersection points are stimulated to sufficient energy levels to accomplish the necessary curing process for forming a three-dimensional object within the volume of the fluid medium. Unfortunately, however, such three-dimensional forming systems face a number of problems with regard to resolution and exposure control. The loss of radiation intensity and image forming resolution of the focused spots as the intersections move deeper into the fluid medium create rather obvious complex control situations. Absorption, diffusion, dispersion and defraction all contribute to the difficulties of working deep within the fluid medium on any economical and reliable basis.

Yet there continues to be a long existing need in the design and production arts for the capability of rapidly and reliably moving from the design stage to the prototype stage and to ultimate production, particularly moving directly from computer designs for such plastic parts to virtually immediate prototypes and the facility for large scale production on an economical and automatic basis.

Accordingly, those concerned with the development and production of three-dimensional plastic objects and the like have long recognized the desirability for further improvement in more rapid, reliable, economical and automatic means which would facilitate quickly moving from a design stage to the prototype stage and to production, while avoiding the complicated focusing, alignment and exposure problems of the prior art three dimensional production systems.

U.S. Pat. No. 6,200,646 to Douglas C. Neckers et al for method for forming polymeric patterns, relief images and colored polymeric bodies using digital light processing technology issued Mar. 13, 2001 provides the state of technology information reproduced below.

The use of photopolymerizable resins to create patterns is known. One process for generating polymeric patterns requires making a mask either through photographic techniques on film or ionographic techniques on glass. The mask is placed between a radiation source such as a UV or visible lamp and the photopolymeric material (liquid, gel or solid) such that the desired light pattern passes through the mask to generate a solid polymer in the desired pattern. These mask techniques are used in photoresists as well as for making 3D objects.

U.S. Pat. No. 7,088,432 to Xiang Zhang for dynamic mask projection stereo micro lithography issued Aug. 8, 2006 provides the state of technology information reproduced below.

Micro-electro-mechanical systems (MEMS) devices have been found in many sensing applications such as airbag sensors, as well as chemical and biological sensors. The use of micro actuators is the key to making MEMS fully active, intelligent "micro-system" devices, capable of both sensing and actuating. Current IC-based micromachining processes, used to fabricate MEMS devices, have certain limitations in achieving the above goals. First, most of the IC-based micromachining processes cannot be used to fabricate complex 3D micro parts with high aspect ratios. Second, only a few semiconductors and other materials can be processed by the current IC-based micromachining for MEMS. Many other important engineering materials, such as smart ceramics, functional polymers, and metal alloys, can not be directly incorporated into MEMS through the conventional IC-based micromachining processes.

As an alternative, an x-ray LIGA (German Lithography, electroforming and molding) process was developed to fabricate microstructures with high aspect ratio. However, the x-ray LIGA process has not found a large number of industrial applications due to its poor industrial accessibility and operational cost. In addition, complex 3D structures can not be achieved by an LIGA process. A novel microfabrication process, the micro stereolithography (.mu.SL) was introduced to fabricate high aspect ratio and complex 3D microstructure by single beam scanning. [Ikuta, K., Ogata, T., and Kojima, S., 1996, "Development of mass productive micro stereo lithography", Proc. IEEE MEMS'96, pp. 301 305.]

Sophisticated 3D parts can be made by scanning an UV beam on a liquid monomer resin, curing the resin into solid polymer layer by layer, and stacking together all layers with various contours.

Recently, liquid crystal display projection micro-stereo-lithography has been used by groups in Europe to project a layer image onto the photo-resist. However, due to the large pixel size and very low transmission in UV, the device's resolution is limited and contrast is poor. Macro scale stereo-lithography, on the other hand, has been around for more than 15 years, mainly with single beam scanning, and commercial applications in this area have also been established such as by 3D Systems Inc. Only recently, scientists have started to use digital light processing technology, for example, using a commercial digital micro-mirror display projector from Texas Instrument to do macro-scale stereo-lithography. However, they use mainly a commercial optical setup from Texas Instruments and focus on macro-scale fabrication for structure and automotive applications rapid prototyping.

The article "Ultralight, Ultrastiff Mechanical Metamaterials" by Xiaoyu Zheng et al in *Science*, Vol. 344, Issue 6190, Jun. 20, 2014, pages 1373-1376 provides the state of technology information reproduced below.

We report a group of ultralight mechanical metamaterials that maintain a nearly linear scaling between stiffness and density spanning three orders of magnitude in density, over a variety of constituent materials. We use the term "mechanical metamaterials" to refer to materials with certain mechanical properties defined by their geometry rather than their composition. The materials described here are highly ordered, nearly isotropic, and have high structural connectivity within stretchdominated, face-centered cubic (fcc) architectures. The ultralow-density regime is accessed by fabricating microlattices with critical features ranging from ~20 mm down to ~40 nm. The densities of samples produced in this work ranged from 0.87 kg/m3 to 468 kg/m3, corresponding to 0.025% to 20% relative density.

A stretch-dominated unit cell structure, consisting of b struts and j frictionless joints and satisfying Maxwell's criterion, $M=b-3j+6>0$, is substantially more mechanically efficient—with a higher stiffness-to-weight ratio (defined as E/r)—than its bend-dominated counterpart. This is attributed to its struts carrying load under compression or tension rather than bending. A fundamental lattice building block of this type is the octet-truss unit cell (FIG. 1A), whose geometric configuration was proposed by Deshpande et al. The cell has a regular octahedron as its core, surrounded by eight regular tetrahedral distributed on its faces (FIG. S1). All the strut elements have identical aspect ratios, with 12 solid rods or hollow tubes connected at each node. The cubic symmetry of the cell's fcc structure generates a material with nearly isotropic behavior. The relative density of such octettruss unit cells can be approximated by $\rho=26.64(d/L)^2$, where L and d are the length and diameter of each beam element. On the macroscale, under uniaxial compressive loading, the relative compressive stiffness and yield strength of these structures theoretically show linear scaling relationships: $E/E_s \propto (\rho/\rho_s)$ and $\sigma/\sigma_s \propto (\rho/\rho_s)$. A cubic lattice is readily constructed by periodic packing of the unit cell along its three principal directions (FIGS. 1, B and C). Alternate orientations of the bulk lattice relative to the unit cell's principal axes can likewise be constructed (FIG. S2), with the fundamental tessellation of space by the unit cell remaining the same.

To study how the loading direction and lattice orientation of an octet-truss lattice affects its E-r scaling relationship, we analyzed, fabricated, and tested them in a variety of orientations (FIGS. S1 to S5). In addition to these stretch-dominated lattices, as a point of comparison, a bend-dominated tetrakaidecahedron unit cell of the same size scale was generated and the corresponding cubic-symmetric foams (known as Kelvin foams) were fabricated with a variety of densities (FIGS. 1, D to F).

The fabrication of these microlattices is enabled by projection microstereolithography, a layer-by-layer additive micromanufacturing process capable of fabricating arbitrary threedimensional microscale structures. In contrast to other three-dimensional (3D) rapid prototyping methods such as 3D printing and ultraviolet (UV) projection waveguide systems (44), this type of fabrication technology is ideal for 3D lattices with thigh structural complexity and with feature sizes ranging from tens of micrometers to centimeters.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Applicant has developed a large area projection micro stereolithography (LAPuSL) system to speedily manufacture large scale complex three dimensional components with micro scale features. The LAPuSL apparatus, systems, and methods use an addressable spatial light modulator (SLM) in coordination with an optical scanning system to make very large stereolithographically produced objects. The SLM is imaged onto a photosensitive material with an optical system that has the ability to direct the image of the SLM over a large area thereby producing a build plane that is much larger than one individual image of the SLM. The pattern change on the SLM is coordinated with where the optical system is directing the image of the SLM. The pattern is updated as the image is moved to a new position via the beam directing optics to effectively create a continuous large image in the photosensitive material. This scanned image is much larger than a single image of the SLM. This enables small feature sizes to be produced over a large area. A single LAPuSL projection and scanning optical system covers a significant area. Individual LAPuSL systems can then be combined together so that there build planes optically overlap to produce even larger stereolithographically fabricated items. The size of the optically projected build plane produced by one LAPuSL system is large enough so that a second LAPuSL system can be brought in next to the first so that their build planes overlap. In this way, the coordination with the SLM pattern change, the scanning optics moving the image, and then two or more LAPuSL's acting as subsystems allow the build plane area to be indefinitely increased which then enable larger size parts to be produced.

The Large Area Projection Micro Stereolithography (LAPuSL) apparatus, systems, and methods can be used to produce large items (hundreds of millimeters in size) with small highly detailed features (10s of microns). Parts produced can be used as master patterns for injection molding, thermoforming, blow molding, and various metal casting processes. The Large Area Projection Micro Stereolithography (LAPuSL) apparatus, systems, and methods can be used to quickly make parts with great complexity and detail. This increased speed and the ability to make parts with small features over a large size distinguishes the LAPuSL apparatus, systems, and methods from other techniques. Rapidly prototyping objects allows the production of customized products for individual customers.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods. It is to be understood that the accompanying drawings are not to scale and are not to be used to define the precise proportions of the elements shown in the drawings.

FIG. 7 is a schematic depiction illustrating ganging multiple large area projection micro stereolithography systems together to produce an ultra large area projection micro stereolithography system.

DETAILED DESCRIPTION OF SPECIFIC EMBODIMENTS

Figure 1:
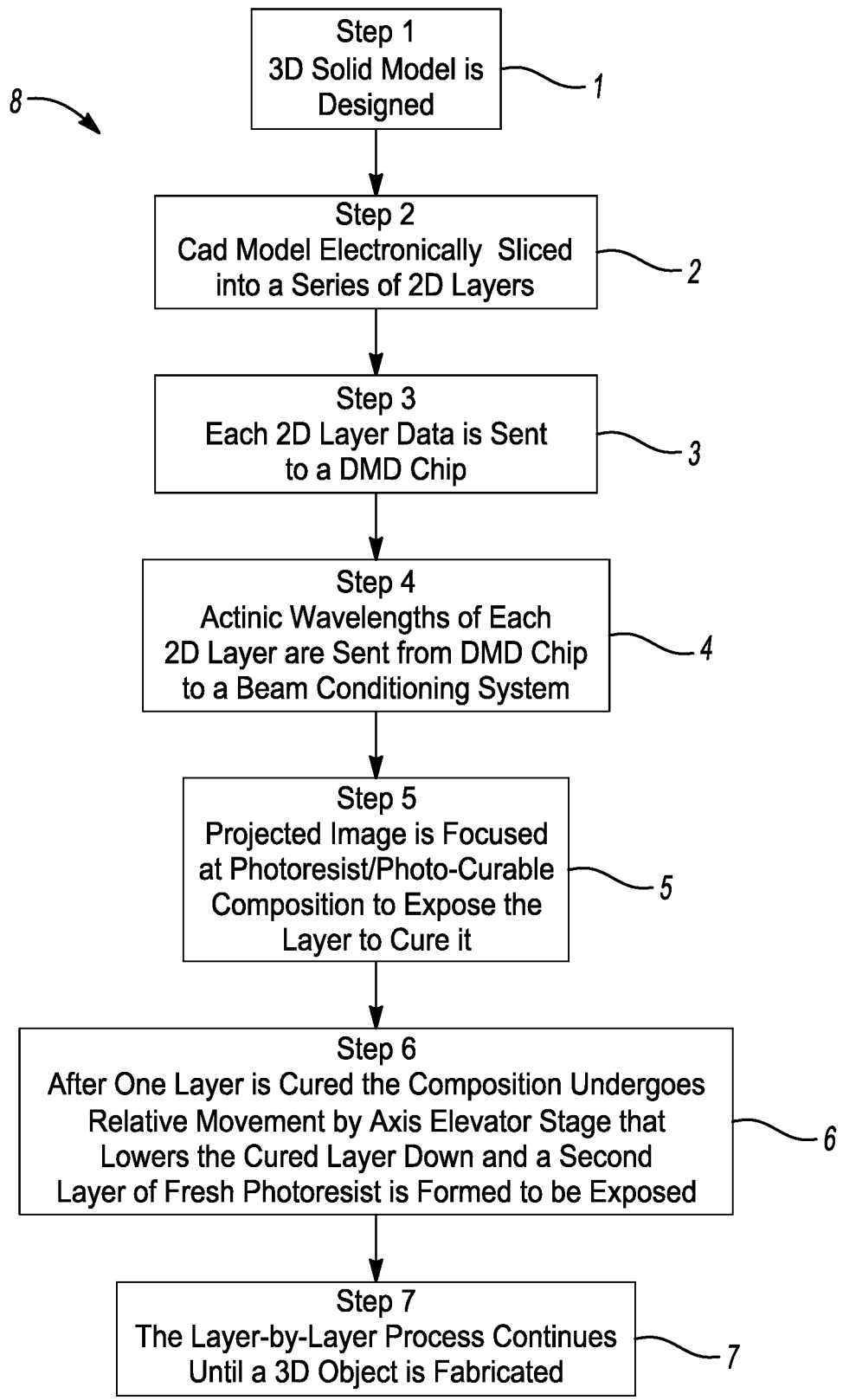
FIG. 1 is a flow chart that illustrates a Prior Art dynamic mask projection stereo micro lithography system.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Prior Art

Figure 2:
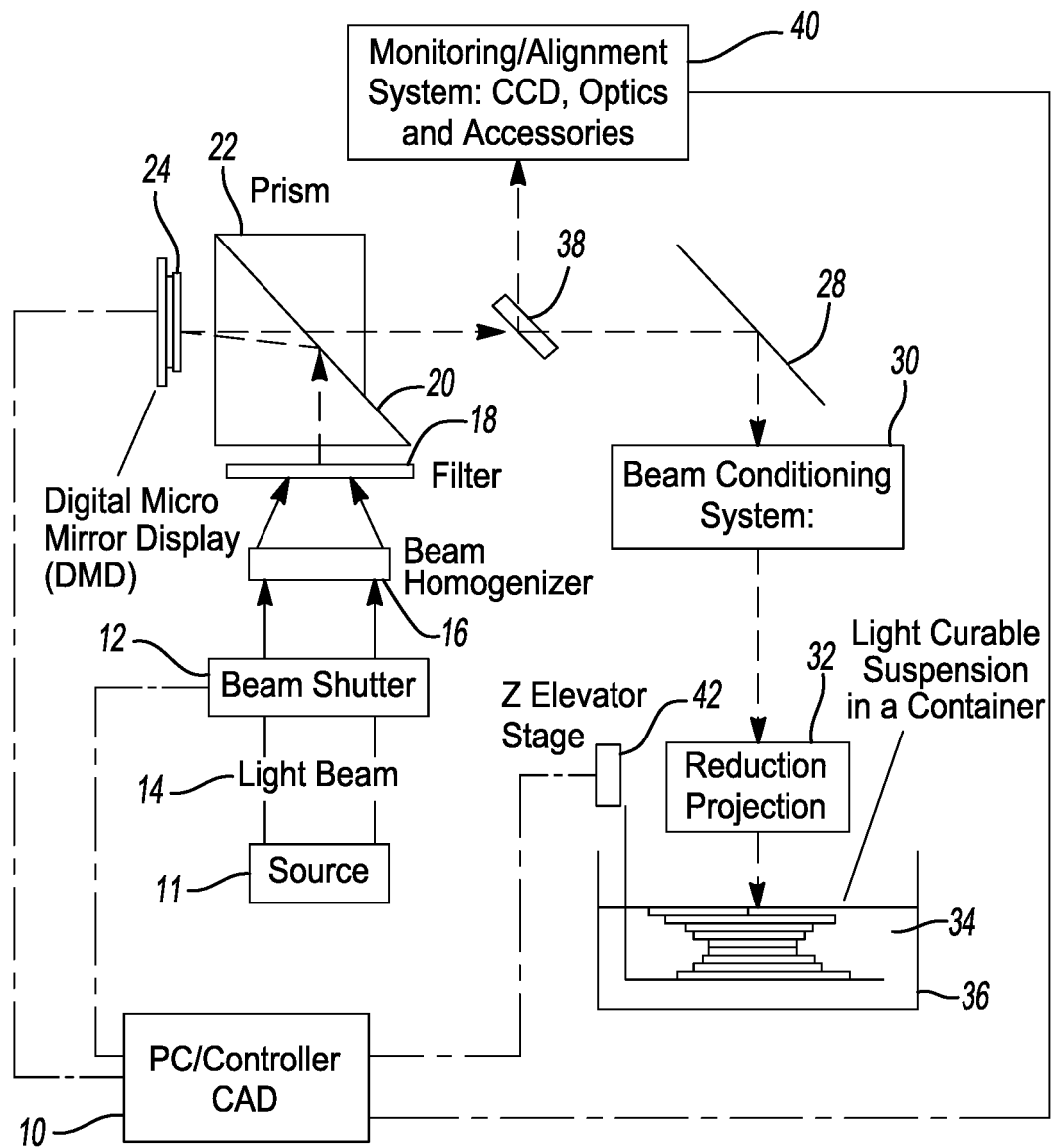
FIG. 2 provides additional information about the Prior Art system illustrated in FIG. 1.

Referring to the drawing and in particular to FIGS. 1 and 2, a Prior Art dynamic mask projection stereo micro lithography system is illustrated. The Prior Art dynamic mask projection stereo micro lithography system is illustrated and described in U.S. Pat. No. 7,088,432 to Xiang Zhang, assigned to the Regents of the University of California, issued Aug. 8, 2006 for dynamic mask projection stereo micro lithography. The disclosure of U.S. Pat. No. 7,088,432 is incorporated herein by this reference. FIG. 1 is a flow chart and FIG. 2 is a schematic depiction of the Prior Art dynamic mask projection stereo micro lithography system.

Referring to FIG. 1, a flow chart that illustrates a series of steps used in the Prior Art dynamic mask projection stereo micro lithography system. The flow chart is designated generally by the reference numeral 8. The steps of the flow chart 8 are described below.

Step 1—3D SOLID MODEL DESIGNED (Reference Numeral 1)—In step 1 a 3D solid model is designed by any suitable method, e.g., by bit mapping or by computer aided design (CAD) software at a PC/controller.

Step 2—CAD MODEL ELECTRONICALLY SLICED INTO SERIES OF 2D LAYERS (Reference Numeral 2)—In step 2 the CAD model is electronically sliced into series of 2-dimensional data files, i.e., 2D layers, each defining a planar cross section through the device to be constructed, and which may be individually stored.

Step 3—EACH 2D LAYER DATA SENT TO A DMD CHIP (Reference Numeral 3)—In step 3 Each 2D layer data is used to control a DMD display via the PC. A beam shutter, which may be an electronic or mechanical shutter, or any other type, is controlled by the PC and in turn controls a light beam which then travels through a beam homogenizer and a narrow band filter, impinging on a mirror of a prism to reflect therefrom to a DMD chip.

Step 4—ACTINIC WAVELENGTHS OF EACH 2-D LAYER IS SENT FROM DMD CHIP TO A BEAM CONDITIONING SYSTEM (Reference Numeral 4)—In step 4 actinic wavelengths of the image pass a beam splitter and is then reflected by a mirror to a beam conditioning system which consists of appropriate apertures and lenses, and then to and through a reduction projection system (which is available commercially from lithography tool companies).

Step 5—PROJECTED IMAGE IS FOCUSED AT PHOTORESIST/PHOTO-CURABLE COMPOSITION TO EXPOSE THE LAYER TO CURE IT (Reference Numeral 5)—In step 5, the projected image is in focus at a particular plane in a photoresist/photo-curable composition in a supporting container so that the actinic light preferentially exposes the desired layer to cure it.

Step 6—AFTER ONE LAYER IS CURED THE COMPOSITION UNDERGOES RELATIVE MOVEMENT BY A Z ELEVATOR STAGE THAT CARRIES THE CURED LAYER DOWN AND A SECOND LAYER OF FRESH PHOTORESIST IS FORMED TO BE EXPOSED (Reference Numeral 6)—In step 6 after one layer is cured, or at least partially cured sufficient to retain its integrity, the composition and focusing optics undergo relative movement. In a particular embodiment of the invention, a computer controlled z elevator stage that carries the cured layer moves down and a second layer of fresh photoresist is formed to be exposed.

Step 7—THE LAYER-BY-LAYER PROCESS CONTINUES UNTIL A 3D OBJECT IS FABRICATED (Reference Numeral 7)—In step 7 the layer-by-layer process continues until a 3D object is fabricated. The elevator motion, beam on/off, and micro-mirror display are synchronized and controlled by the computer.

Referring to FIG. 2, additional information is provided about the Prior Art dynamic mask projection stereo micro lithography system illustrated in the flow chart 8 shown in FIG. 1. FIG. 2 is a schematic depiction of the Prior Art dynamic mask projection stereo micro lithography system. The Prior Art dynamic mask projection stereo micro lithography system chart is designated generally by the reference numeral 9.

In FIG. 2, a 3D solid model is designed by any suitable method, e.g., by bit mapping or by computer aided design (CAD) software at a PC/controller 10. The CAD model is then electronically sliced into series of 2-dimensional data files, i.e., 2D layers, each defining a planar cross section through the device to be constructed, and which may be individually stored. Each 2D layer data is used to control a DMD display via the PC 10. A beam shutter 12, which may be an electronic or mechanical shutter, or any other type, is controlled by the PC 10 and in turn controls a light beam 14 which then travels through a beam homogenizer 16 and a narrow band filter 18, impinging on the mirror 20 of a prism 22 to reflect therefrom to a DMD chip 24.

The DMD chip 24 is formed with more than a half million mirrors, each individually addressed electronically and deflecting a homogenized light beam back through the prism 22. Actinic wavelengths of the image pass a beam splitter 38 and are then reflected by a mirror 28 to a beam conditioning system 30 which consists of appropriate apertures and lenses, and then to and through a reduction projection system 32 (which is available commercially from lithography tool companies). The projected image is in focus at a particular plane in a photoresist/photo-curable composition 34 in a supporting container 36 so that the actinic light preferentially exposes the desired layer to cure it.

A source of actinic light 11 may be any number of available sources, including, but not limited to metal halide, tungsten halogen and xenon lamps or lasers, e.g., an ultraviolet light laser. A beam splitter 38 is used to assist monitoring/alignment for the fabrication.

After one layer is cured, or at least partially cured sufficient to retain its integrity, the composition and focusing optics undergo relative movement. In a particular embodiment of the invention, a computer controlled z elevator stage 42 that carries the cured layer moves down and a second layer of fresh photoresist is formed to be exposed. The layer-by-layer process continues until a 3D object is fabricated. The elevator motion, beam on/off, and micro-mirror display are synchronized and controlled by the computer 10.

LAPuSL

Applicant has developed a large area projection micro stereolithography (LAPuSL) system capable of speedily manufacturing large scale complex three dimensional components with micro scale features. The LAPuSL has the ability to make objects which can be tens to hundreds of millimeters in overall size, with features on the object that can be microns in size, and do this quickly, simply, and reliably. Applicant's large area projection micro stereolithography system (LAPuSL) produces a product by creating a three dimensional computer aided design model of the product, generating a multiplicity of two-dimensional computer generated slices of the product from the three dimensional computer aided design model of the product, subdividing the computer generated slices of the product into discrete regions, and producing images of the discrete regions and sequentially sending the images to a curable resin to complete the product.

Referring to FIGS. 3A through 3E and FIGS. 4 and 5, a flow chart and a series of schematic depictions illustrate one embodiment of the disclosed large area projection micro stereolithography (LAPuSL) apparatus, systems, and methods.

Figure 3A:
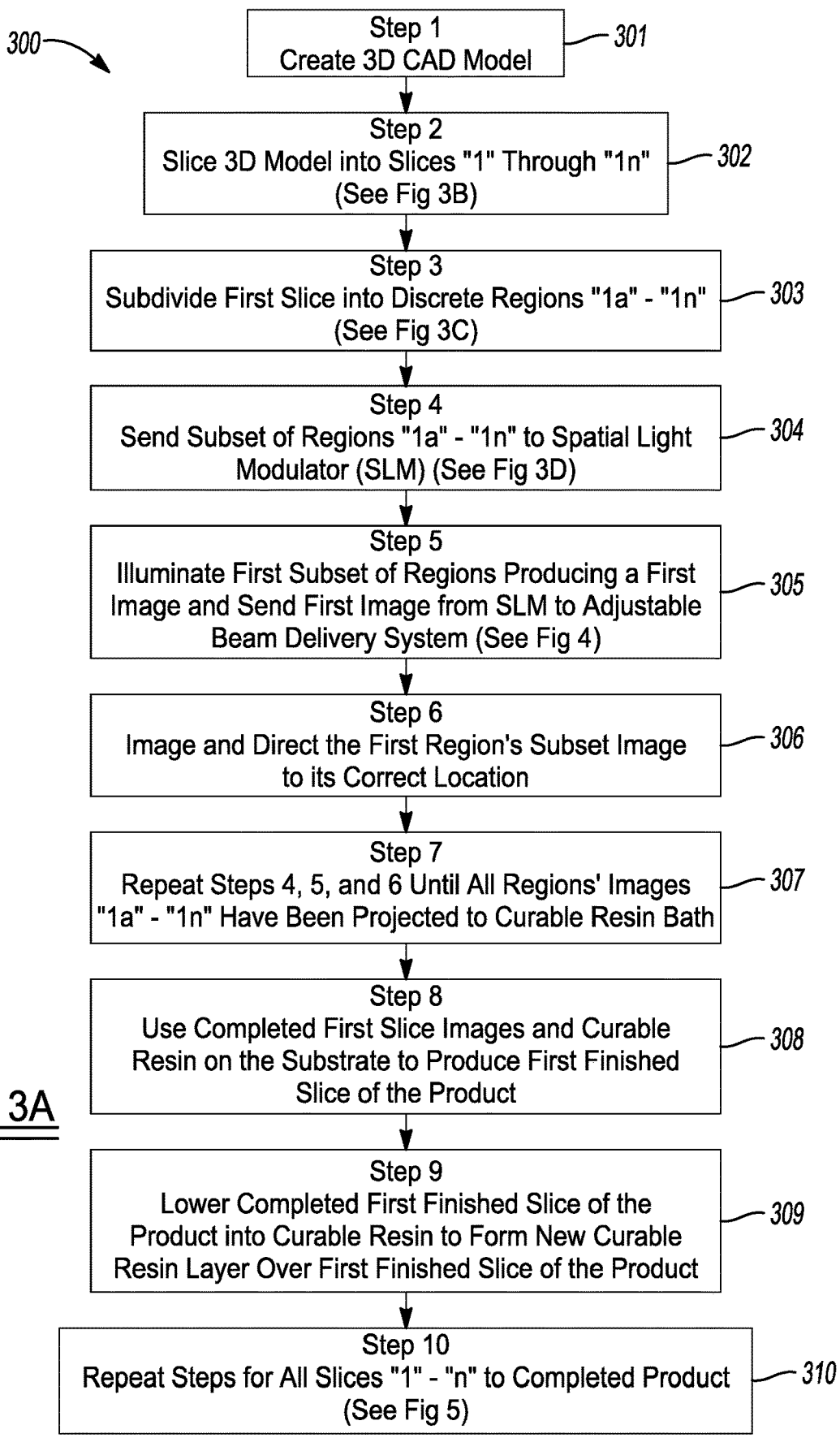
FIG. 3A is a flow chart illustrating one embodiment of the disclosed large area projection micro stereolithography (LAPuSL) apparatus, systems, and methods.

FIG. 3A is a flow chart that illustrates one embodiment of the disclosed large area projection micro stereolithography (LAPuSL) apparatus, systems, and methods. This embodiment is designated generally by the reference numeral 300. The steps in FIG. 3A are described below.

Step 1—CREATE 3-D CAD MODEL (Reference Numeral 301)—In step 1 a 3D CAD model is created. The 3D CAD model is designed using computer aided design (CAD) software.

Step 2—SLICE 3D MODEL INTO SLICES (Reference Numeral 302)—In step 2 the 3-D CAD model is virtually via software sliced into a series of 2-dimensional data files ("1" through "n" files). The files are 2D layers, each defining a planar cross section through the device to be constructed, and which may be individually stored. The 2D layers defining a planar cross section through the device to be constructed are further illustrated in FIG. 3B.

Step 3—SUBDIVIDE FIRST SLICE INTO DISCRETE REGIONS (Reference Numeral 303)—In Step 3 the $1^{st}$ 2-D slice is subdivided into discrete regions virtually via software and individually stored. The $1^{st}$ 2-D slice subdivided into discrete regions is further illustrated in FIG. 3C.

Step 4—SEND A SINGLE REGION TO A SPATIAL LIGHT MODULATOR (SLM) (Reference Numeral 304)—In step 4 a single subset of regions of the $1^{st}$ 2-D slice is sent to a spatial light modulator. The subset of the $1^{st}$ 2-D slice being sent to a spatial light modulator is then reproduced on the face or working surface of the SLM and is further illustrated in FIG. 3D.

Step 5—ILLUMINATE THE SLM WHICH HAS REPRODUCED THE FIRST REGIONS SUBSET TO PRODUCE A FIRST REGIONS SUBSET IMAGE AND SEND FIRST REGIONS SUBSET IMAGE TO AN ADJUSTABLE BEAM DELIVERY SYSTEM (Reference Numeral 305)—In step 5 a light source illuminates the SLM working surface which has reproduced the first subset of regions and the image is sent to an adjustable beam delivery system. The illumination of the first regions subset image and the projection/scanning of the first regions subset image are further illustrated in FIG. 4.

Step 6—IMAGE AND DIRECT THE FIRST REGIONS SUBSET IMAGE TO ITS CORRECT LOCATION (Reference Numeral 306)—In step 6 the adjustable beam delivery system directs and projects the first regions subset image to its correct location.

Step 7—REPEAT STEPS 4, 5 AND 6 UNTIL ALL THE REGIONS HAVE BEEN PROJECTED TO THE CURABLE RESIN BATH (Reference Numeral 307)—In step 6 the steps 4, 5 and 6 are repeated until all of the regions have been projected to the curable resin bath.

Step 8—USE COMPLETED FIRST SLICE IMAGES AND CURABLE RESIN ON THE SUBSTRATE TO PRODUCE A FIRST FINISHED SLICE OF THE PRODUCT (Reference Numeral 308)—In step 8 the completed first slice image in the curable resin on the substrate provides a first finished slice of the product.

Step 9—LOWER COMPLETED FIRST FINISHED SLICE OF THE PRODUCT INTO THE CURABLE RESIN BATH TO FORM A NEW CURABLE RESIN LAYER OVER FIRST FINISHED SLICE OF THE PRODUCT (Reference Numeral 309)—In step 9 the first finished slice of the product is lowered into the curable resin bath. A new curable resin layer is formed over the first finished slice of the product and the new curable resin layer is used to complete the next slice:

Step 10—REPEAT STEPS FOR ALL SLICES TO COMPLETED PRODUCT (Reference Numeral 310)—In step 10 the steps for all slices are repeated in order to complete the product. The steps used in completing the product are further illustrated in FIG. 5.

One Slice of the 3D CAD Model

Figure 3B:
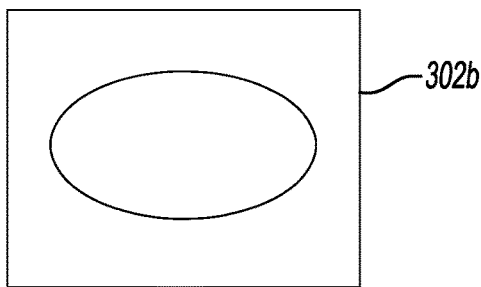
FIGS. 3B-3E provide additional details of individual steps of the flow chart of FIG. 3.

Referring to FIG. 3B, a schematic depiction illustrates one slice of the 3D CAD model that was created using computer aided design (CAD) software. The slice is designated generally by the reference numeral 302b. The 3-D CAD model was electronically sliced into a series of 2-dimensional data files ("1" through "n" files). Each of the files is a 2D layer defining a planar cross section through the device to be constructed. The 2D layer, slice 302b, defines a planar cross section through the device to be constructed.

Subdividing Slice Into Discrete Regions

Figure 3C:
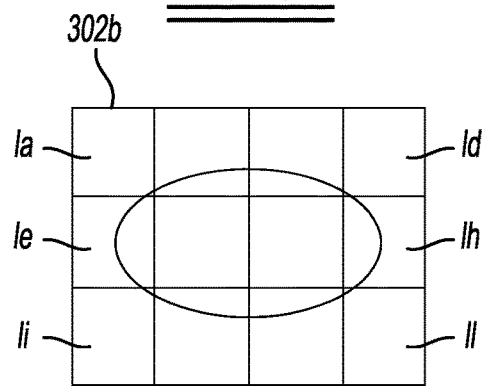

Referring to FIG. 3C, a schematic depiction illustrates the subdividing of the slice 302b into discrete regions. The regions are identified as regions "1a" through "1l."

Subset of Regions Sent to Spatial Light Modulator (SLM)

Figure 3D:
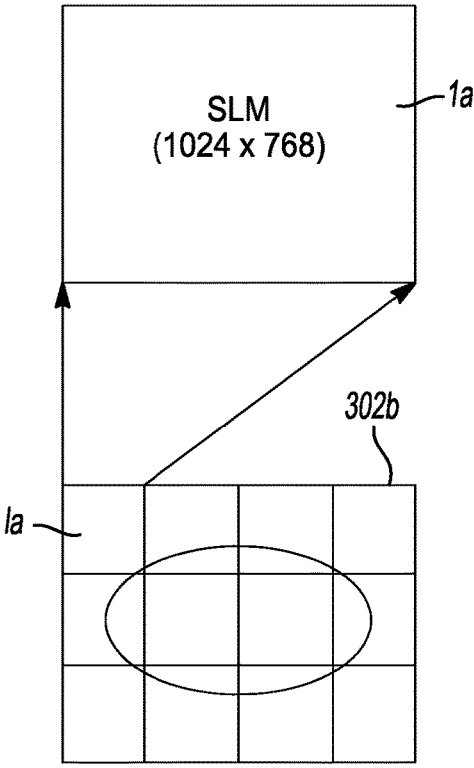

Referring to FIG. 3D, a schematic depiction illustrates the sending of a subset of regions to a spatial light modulator (SLM). As illustrated in FIG. 3D, a subset of regions of slice 302b, that being region 1a, is sent to the SLM.

Completed First Slice Image in Curable Resin

Figure 3E:
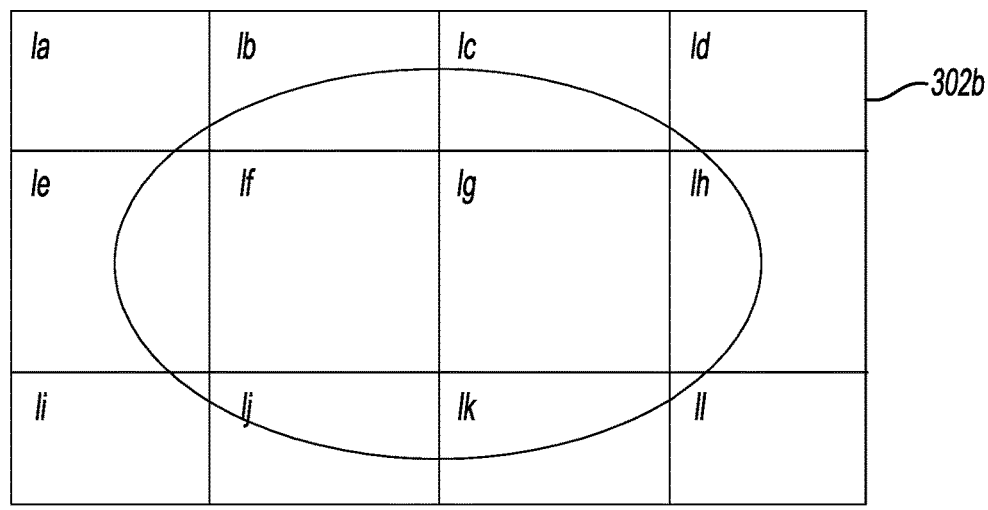

Referring to FIG. 3E, a schematic depiction illustrates that after the adjustable beam delivery system images all of the first subset of regions image 1a-1l of the slice 302b onto their correct and respective locations on the build plane, the completed first slice 302b image in curable resin has now produced a first finished slice of the product.

Beam Delivery System Images to Coordinated and Controlled Locations

Figure 4:
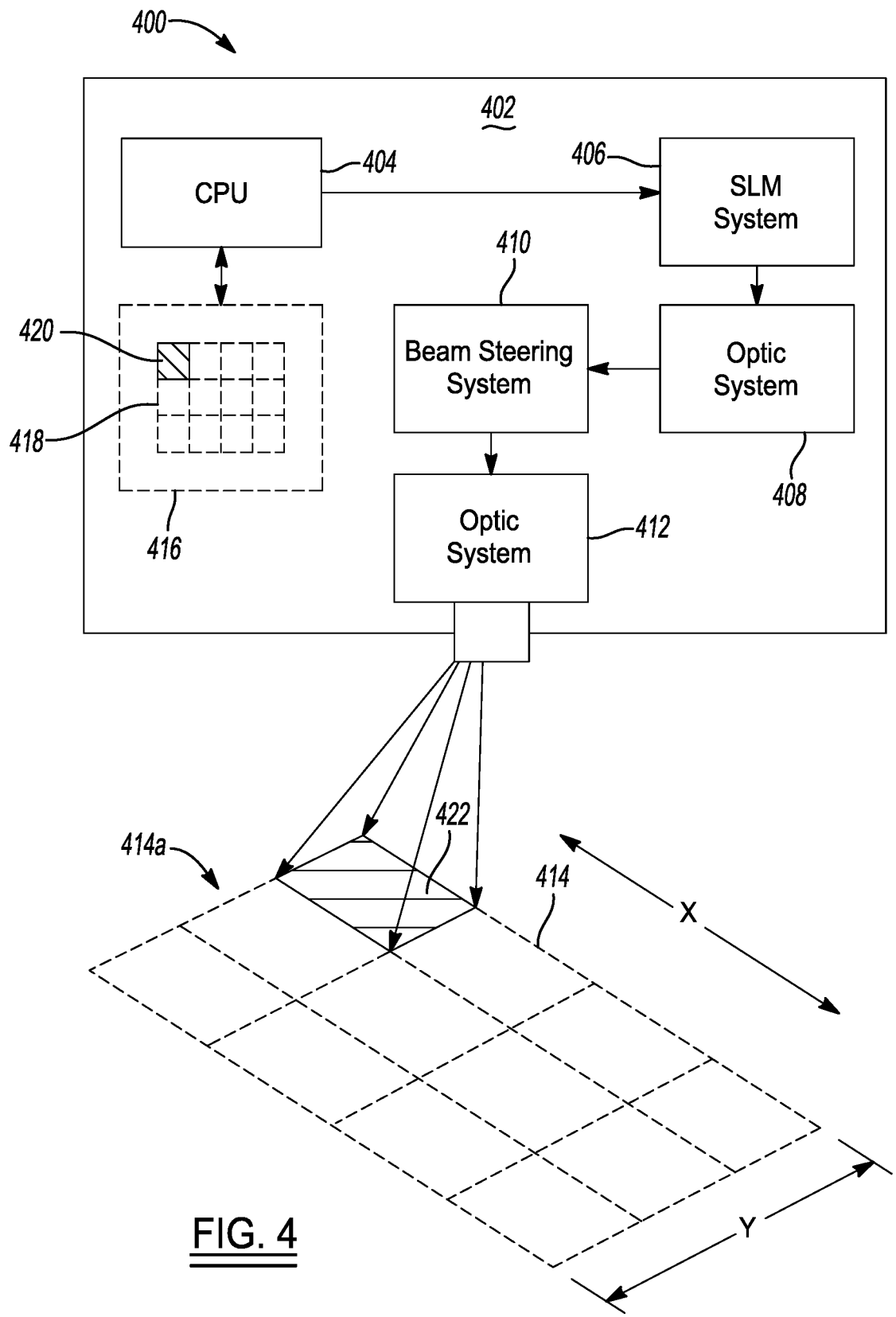
FIG. 4 is a schematic depiction illustrating the adjustable beam delivery system projecting and scanning the first subset of regions image.

Referring to FIG. 4 a schematic depiction illustrates the adjustable beam delivery system 400 projecting the first subset of regions 1a associated image to its correct location. FIG. 4 shows the structural elements of the system 400 identified and described below.

Reference numeral 402—large area projection micro stereolithography (LAPuSL) system.

Reference numeral 402—LAPuSL unit.
Reference numeral 404—CPU.
Reference numeral 406—SLM system.
Reference numeral 408—optics system.
Reference numeral 410—beam directing optics (or directing mirrors or steering mirrors).
Reference numeral 412—optics system.
Reference numeral 414—build plane.
Reference numeral 414a—complete image created by system 400.
Reference numeral 416—dashed line box.
Reference numeral 418—subset of regions.
Reference numeral 420—region 1a.
Reference numeral 422—region 1a after processing by the LAPuSL unit.

The structural elements of the system 400 having been identified and described, the operation of the system 400 will now be considered.

The processing of the items 418 and 420 enclosed in the dashed line box 416 takes place within the CPU 404. A 3-D CAD system (not shown) creates a model which is sliced into layers 1-n. The first layer 418 is then divided into regions 1a-1l. Here we show 12 regions for clarity of illustration. The layer can be divided into 1a-1n regions. Region 1a is here labeled 420 and is shown cross hatched as region 422 after processing by the system 400. Each of the regions is then sent to the SLM system 406 and subsequently thru 408, 410, and 412 to be projected to their appropriate locations to create image 414a on the build plane 414.

Repeat Steps for All Slices to Complete Product

Figure 5:
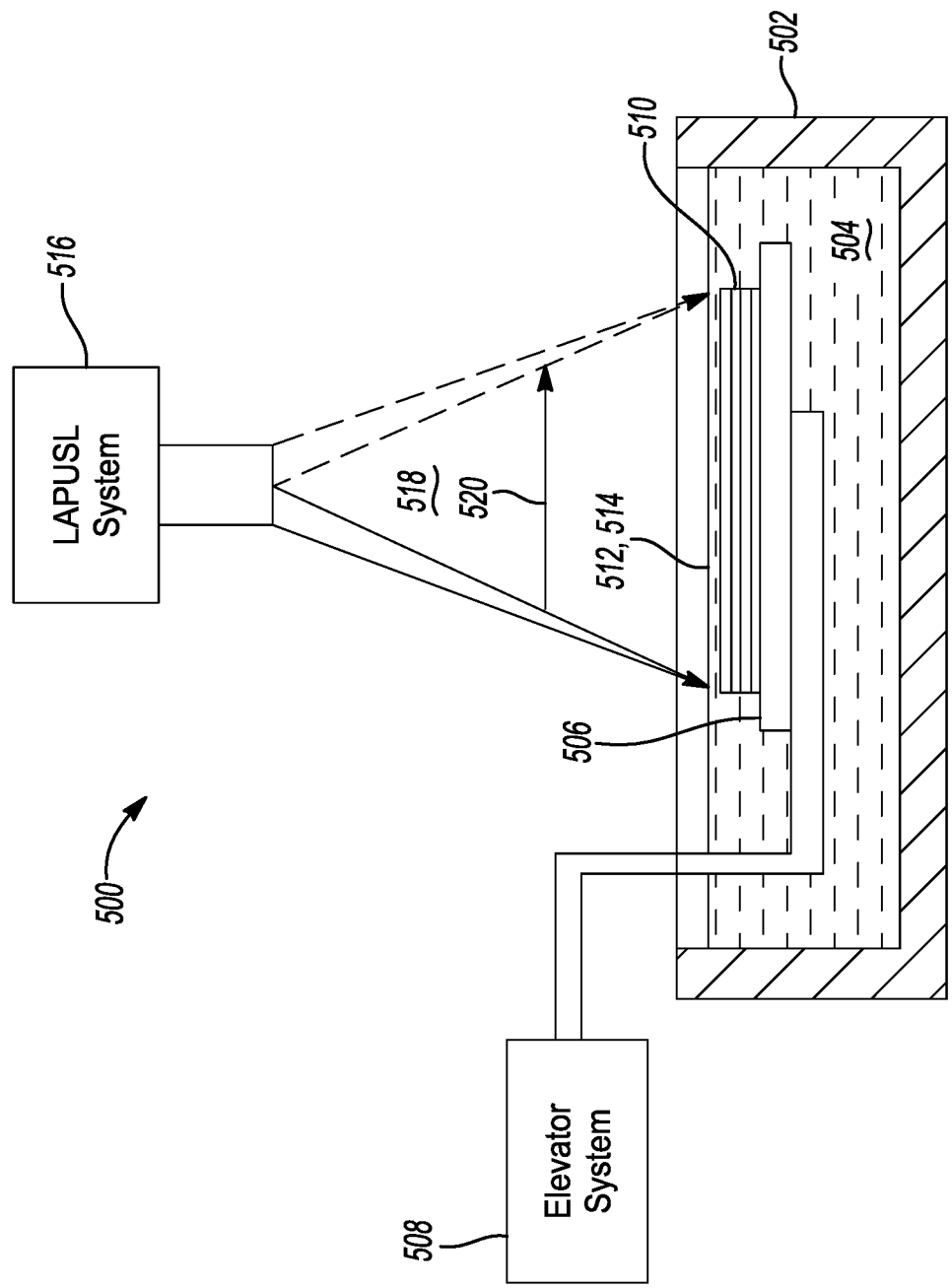
FIG. 5 is a schematic depiction illustrating repeating the steps for all slices to complete the product.

Referring to FIG. 5 a schematic depiction illustrates repeating the steps for all slices to complete the product. The schematic depiction is designated generally by the reference numeral 500.

In steps 6, 7, and 8 illustrated in FIG. 3A, the first image was sent to an adjustable delivery system and the steps were repeated until all of the discrete regions were projected to the curable resin bath. The completed first slice image was used to produce a first finished slice of the product. FIG. 5 illustrates the additional procedures for completing the product. Referring again to FIG. 5, the structural elements of the system 500 are identified and described below.

Reference numeral 502—container.
Reference numeral 504—curable polymer bath.
Reference numeral 506—substrate.
Reference numeral 508—elevator system.
Reference numeral 510—completed layers.
Reference numeral 512—surface of polymer bath 504 (Also designated as the build plane 514)
Reference numeral 514—build plane.
Reference numeral 516—LAPuSL system.
Reference numeral 518—projected image beam.
Reference numeral 520—arrow showing beam movement.

The various structural components and steps of the system 500 having been identified and described, the operation of the system 500 will now be considered. The LAPuSL system 516 projects the image beam 518 onto the build plane 514 to cure the curable monomer material 504 and produce individual layers. The arrow 520 illustrates movement of the image beam 518. The elevator system 508 sequentially lowers the finished layers into the curable monomer bath 504 to allow a fresh layer of curable monomer material 504 to coat the previous layer. The steps for all slices are repeated to complete the product.

LAPuSL System's Overlapping Projection Images

Applicant has discovered that a superior product can be produced by overlapping the projection images. As previously illustrated in FIGS. 4 and 5 the adjustable beam delivery system projects the subsets of regions images to their correct location relative to the substrate and the curable polymer resin. Applicant discovered that without overlapping, the product produced would sometimes have lines between the locations of adjacent projection images. FIGS. 6A-6I illustrate the overlapping of the projection images. The overlapping of the projection images solves the potential problem of lines in the product between the locations of adjacent projection images. The various structural components and steps of the overlapping of the projection images are identified and described below.

Reference numeral 600—Substrate.
Reference numeral 602—Area that represents a finished layer.
Reference numeral 604—First Projected Image.
Reference numeral 606—Overlap (Unspecified Dimension).
Reference numeral 608—Dark Region.
Reference numeral 610—Second Projected Image.
Reference numeral 612—Third Projected Image.

Reference numeral 614—Fourth Projected Image.
Reference numeral 616—Fifth Projected Image.
Reference numeral 618—Sixth Projected Image.
Reference numeral 620—Next to Final Projected Image.
Reference numeral 622—Dark Region.
Reference numeral 624—Dark Region.
Reference numeral 626—Final Projected Image.

The various structural components and steps of the overlapping of the projection images having been identified and described, the operation of the system will now be considered. FIGS. 6A-6I illustrate a multi-step depiction of the projected images overlapping. In FIGS. 6A through 6I Applicant will illustrate and describe a system of overlapping projected images.

Figure 6A:
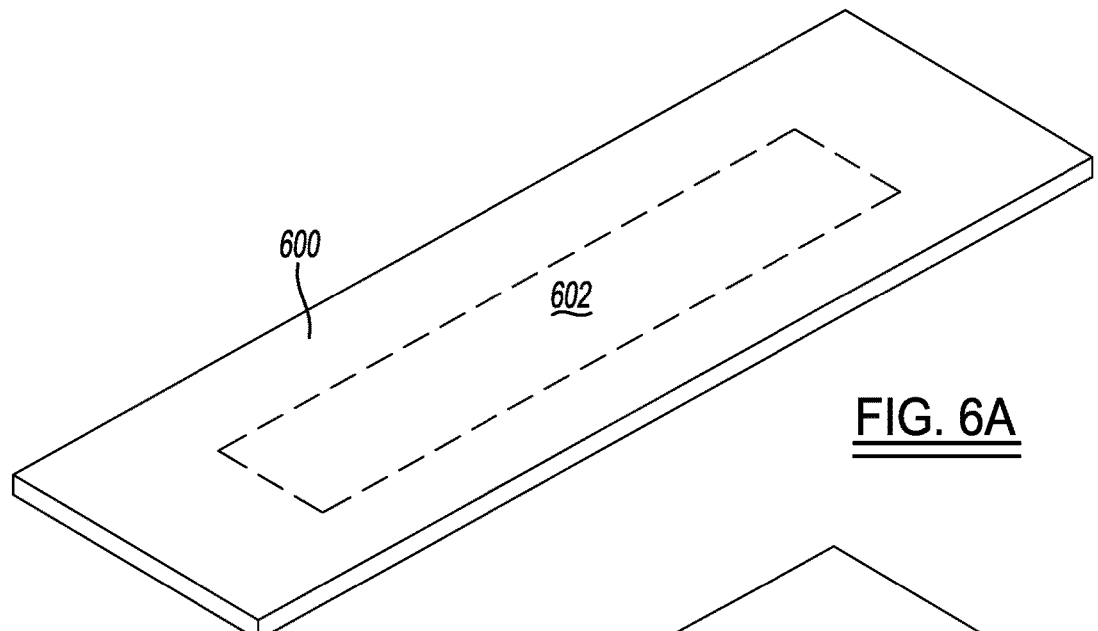
FIGS. 6A-6I illustrate the overlapping of the projection images.
Figure 6B:
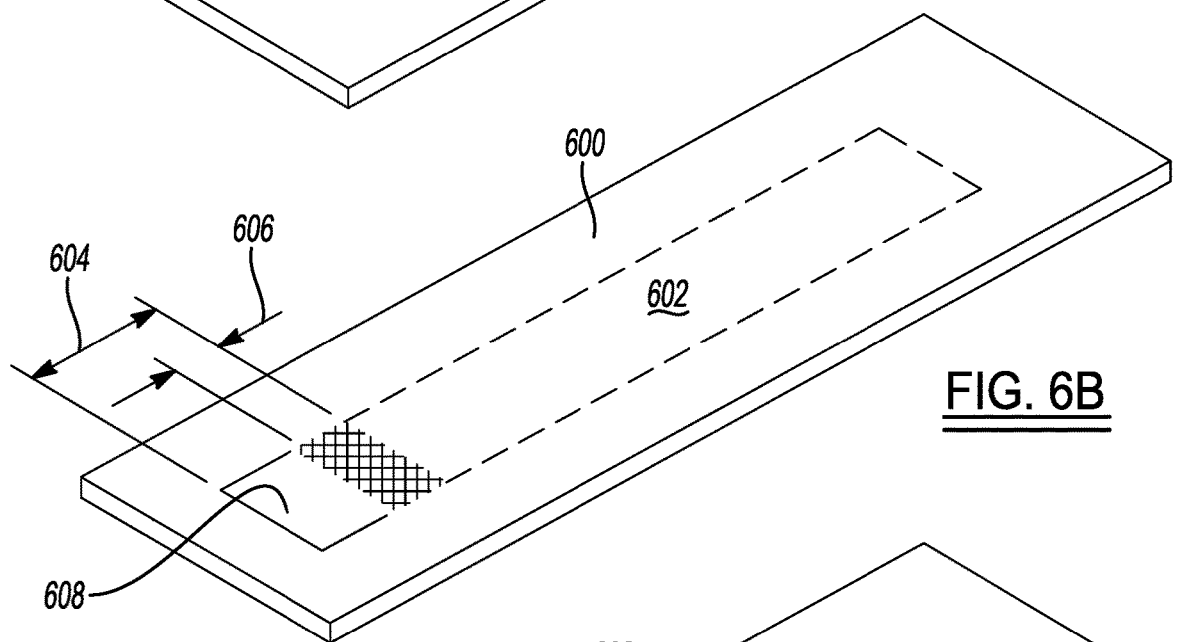

Shown in FIG. 6A is a substrate 600 and an area 602 in dashed lines that represents a finished layer of overlapping projected images. FIG. 6B shows a first projected image 604 overlapping the area 602 by some unspecified dimension 606. Also shown is an area that will not be part of the finished layer and which is designated as dark region 608 in FIG. 6C.

Figure 6C:
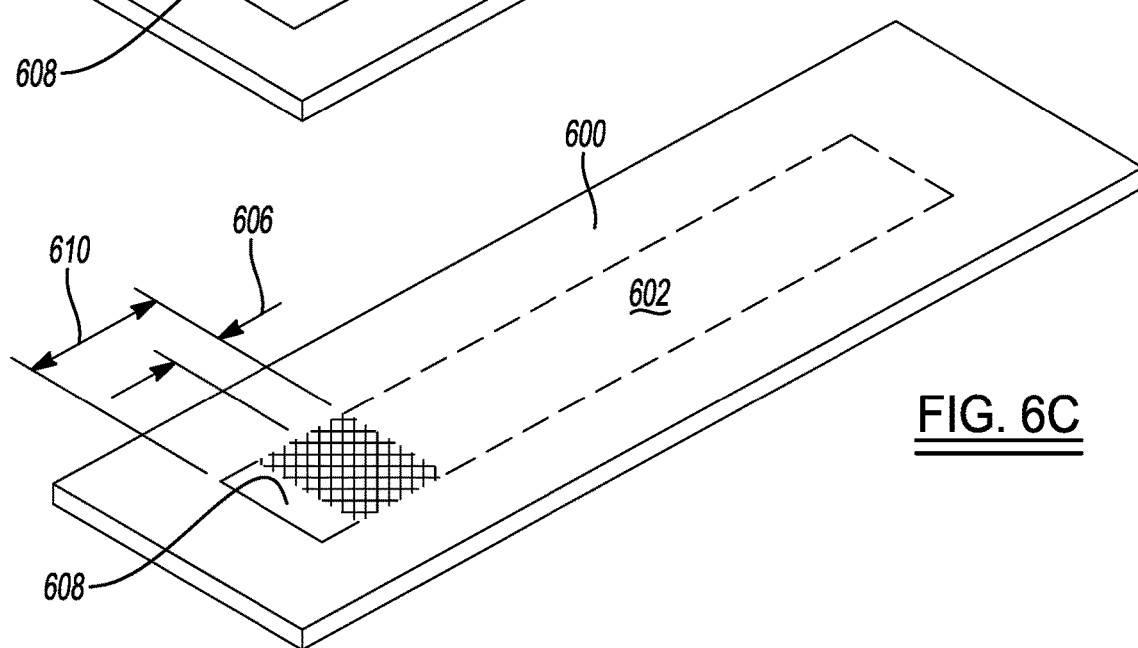

FIG. 6C shows a second projected image 610 that overlaps the first projected image 604 by the same amount of overlap 606. Also shown is the smaller dark region 608.

Figure 6D:
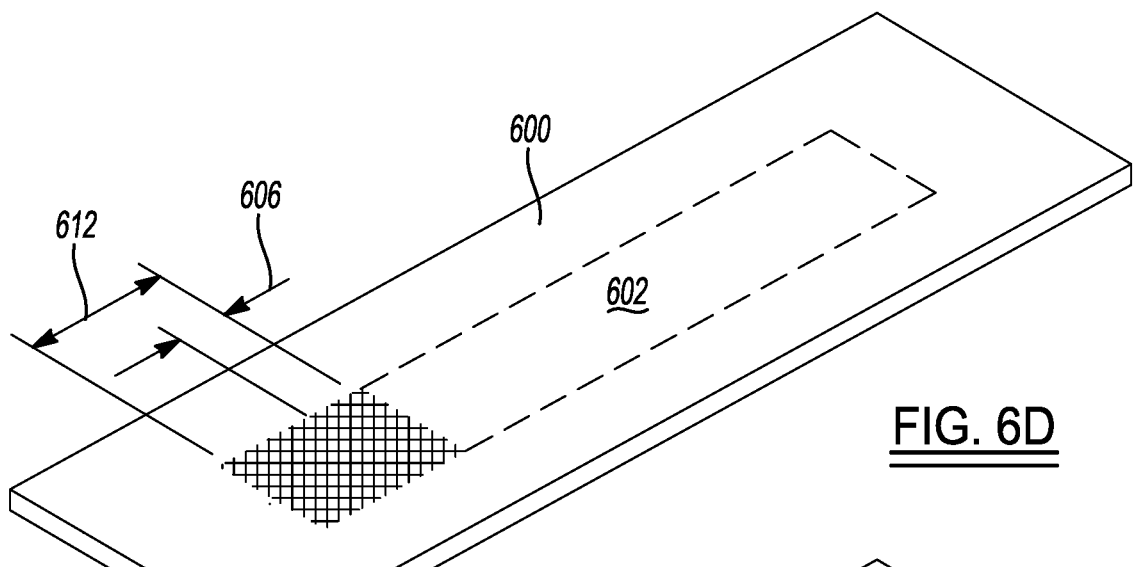
Figure 6E:
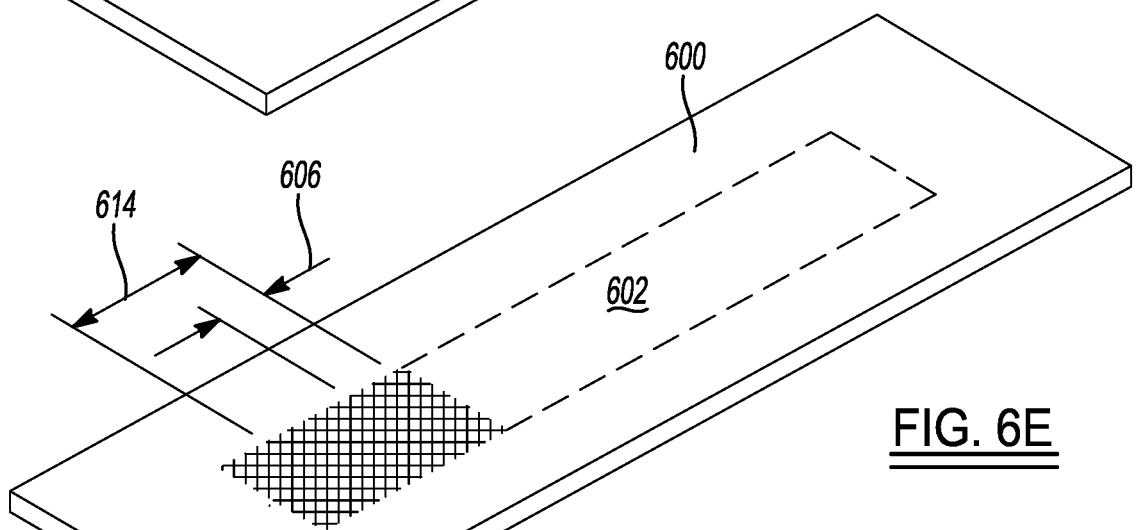
Figure 6F:
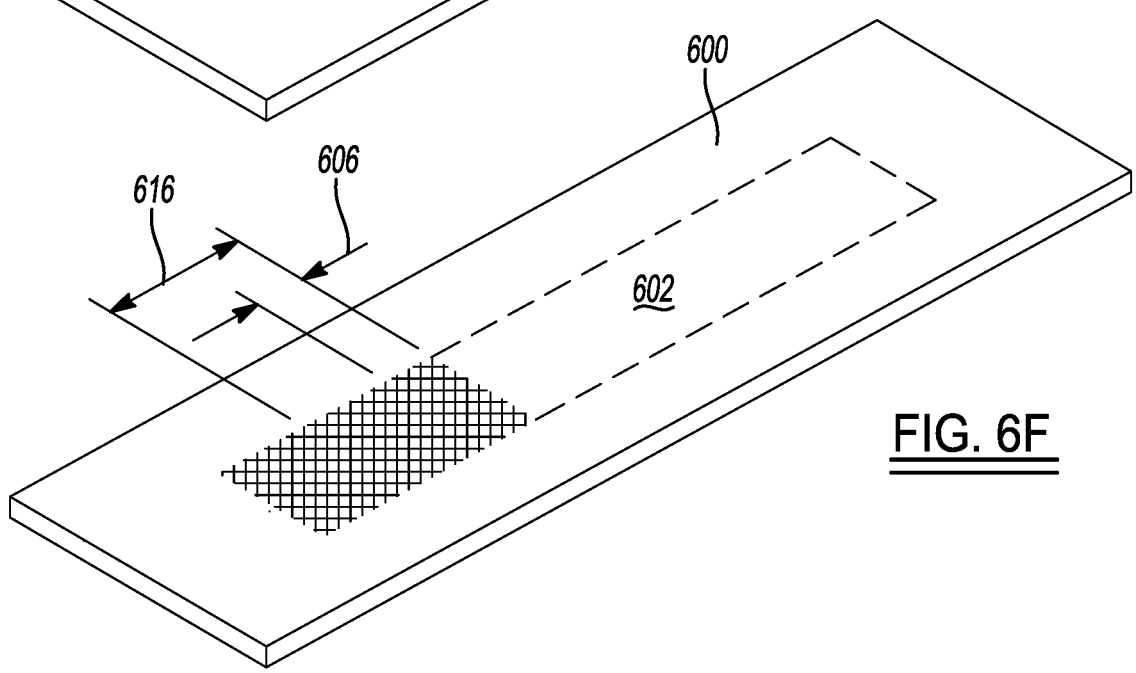
Figure 6G:
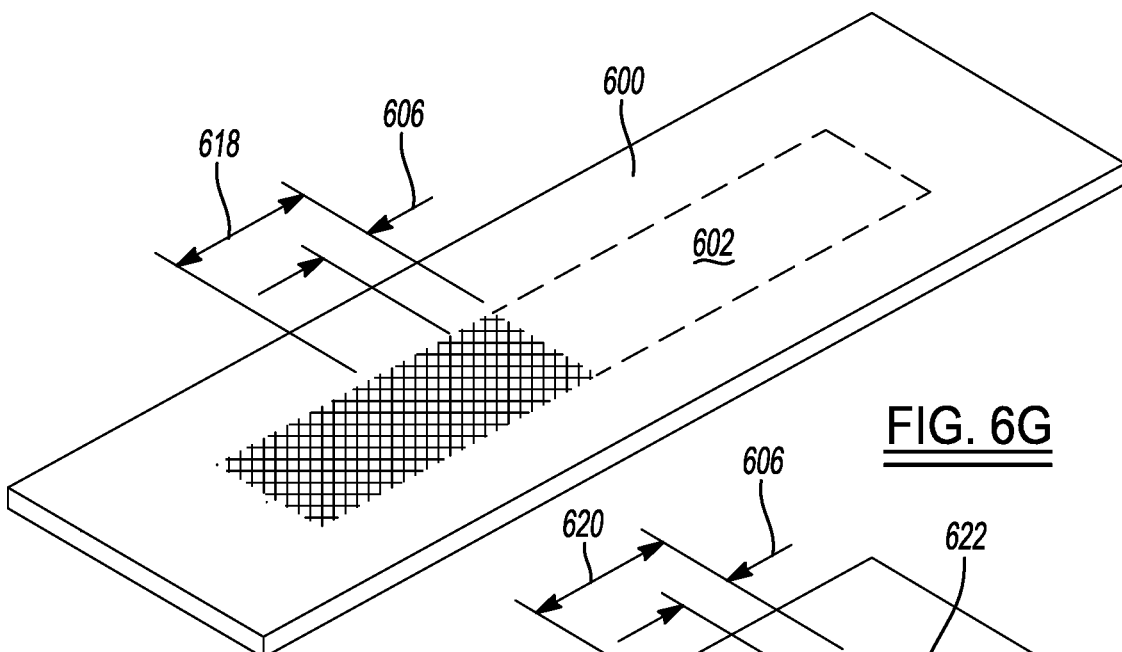

FIG. 6D shows a third projected image 612 that again overlaps the previously projected image 610 by the same overlap 606. This projected image 612 and succeeding images are illustrated as 614 on FIG. 6E; 616 on FIG. 6F; 618 on FIG. 6G; 620 on FIG. 6H; and 626 on FIG. 6I.

Figure 6H:
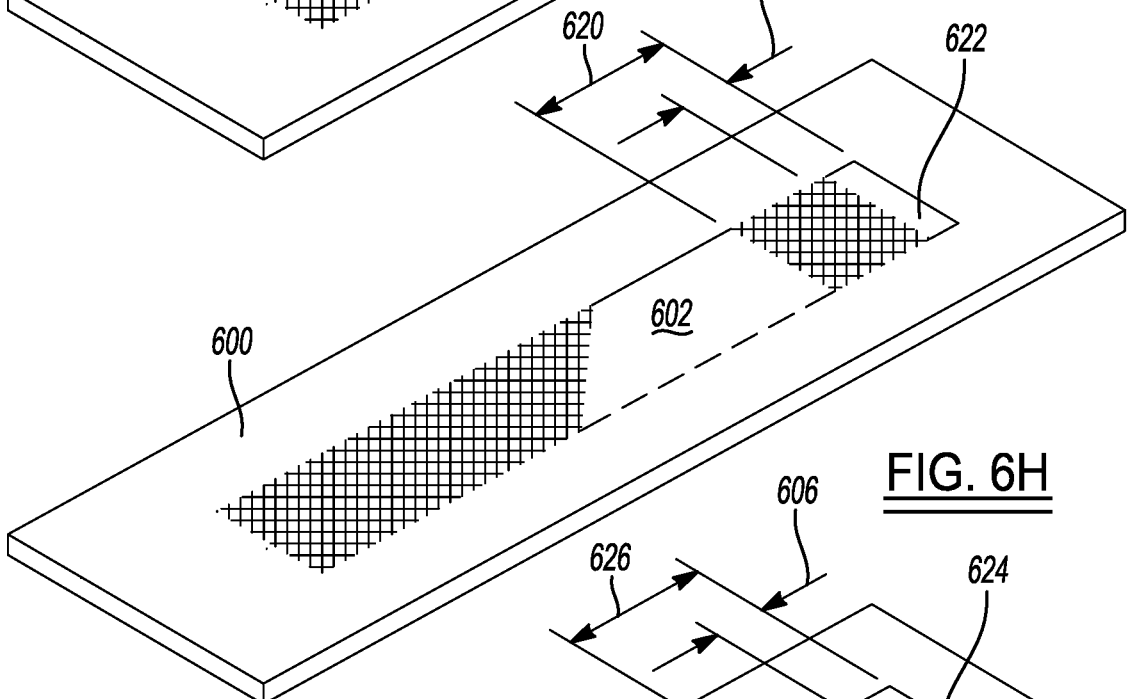

FIG. 6H shows the next to final projected image 620 overlapping area 602 by the overlapping dimension 606. A dark region 622 is formed during this image projection.

Figure 6I:
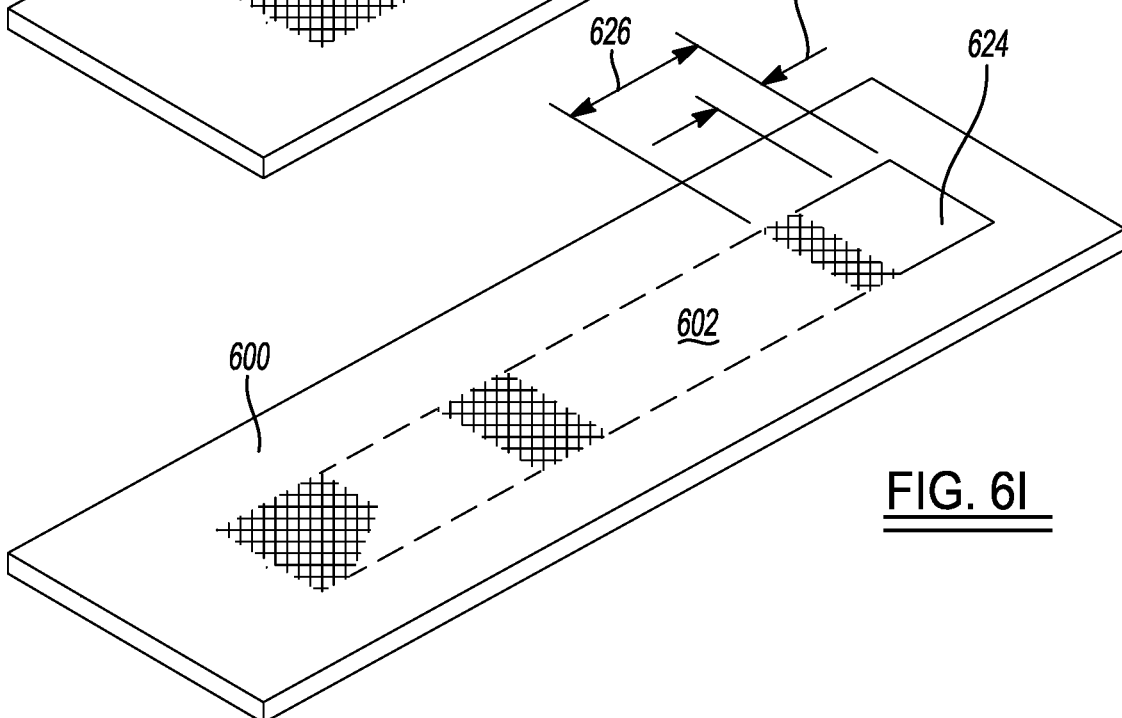

FIG. 6I shows that the final projected image 626 overlaps again by dimension 606 forming a dark region 624. The foregoing steps provide a completed layer.

Applicant's LAPuSL system provides a large area projection micro stereolithography system for producing the final product by the previously described overlapping the projection images. A three dimensional computer aided design model of the product is first created. Then a multiplicity of two-dimensional computer generated slices of the product are generate from the three dimensional computer aided design model of the product. The slices including a first slice, a second slice, and additional slices. The first slice is subdivided into discrete regions including a first subset of regions, a second subset of regions, and additional subsets of regions. The first subset of regions is sent to a spatial light modulator. The first subset of regions is illuminated to produce a first subset of regions image. The first subset of regions image is sent to an adjustable beam delivery system. The adjustable beam delivery system projects and scans the first subset of regions image to a curable resin. The steps are repeated for the second subset of regions and the additional subsets of regions to complete a first slice of the product. Applicant's LAPuSL system utilizes the above described overlapping projected images in creating the first slice of the product. All of steps are repeated for the second slice and the additional slices to complete the final product.

Ganging Multiple Systems

The LAPuSL system described above can be improved by ganging multiple large area projection micro stereolithography systems together to produce an ultra large area projection micro stereolithography system. FIG. 7 is a schematic depiction illustrating a system 700 configured for ganging multiple large area projection micro stereolithography systems together to produce an ultra large area projection micro stereolithography system. The structural elements of the system 700 are identified and described below.

Reference numeral 702—first LAPuSL system.
Reference numeral 704—second LAPuSL system.
Reference numeral 706—third LAPuSL system.
Reference numeral 708—fourth LAPuSL system.
Reference numeral 710—container.
Reference numeral 712—elevator system.
Reference numeral 714—substrate.
Reference numeral 716—curable polymer bath.
Reference numeral 718—completed layers.
Reference numeral 720—surface of polymer bath.
Reference numeral 722—build plane.
Reference numeral 724—projected image beams.

The various structural components and steps of the system 700 having been identified and described, the operation of the system 700 will now be considered. FIG. 7 is a schematic depiction illustrating ganging multiple large area projection micro stereolithography systems together to produce an ultra large area projection micro stereolithography system.

As illustrated in FIG. 7, a first LAPuSL system 702, a second LAPuSL system 704, a third LAPuSL system 706 and a fourth LAPuSL system 708 are positioned above a container 710 containing a curable polymer bath 716. An elevator system 712 moves the layers into and out of the curable polymer bath 716.

The system 700 for ganging multiple large area projection micro stereolithography systems together to produce an ultra large area projection micro stereolithography system utilizes the previously describe individual system. The system 700 projects multiple build areas 724 that overlap the image onto the build plane 720, 722 to cure the curable polymer material 716, 722 and produce individual layers 718. The elevator system 712 sequentially lowers the finished layers into the curable polymer bath 716 to allow a fresh layer of curable polymer material 722 to coat the previous layer. The steps for all slices are repeated to complete the product.

The LAPuSL can then be combined with other LAPuSL systems to make even larger overall objects. This combining of more than one LAPuSL together is very powerful and enables an essentially limitless increase in the size of the objects which can be produced. To explain how this is done; X is defined as the diameter of the area which can be scanned by one LAPuSL system, the physical size of the scan lens and scanning optics is made to be smaller than X. So with the scan area large enough, and the body of the LAPuSL small enough, two or more LAPuSL's can be placed together so that the area they scan overlaps each other. The images being written by the two or more LAPuSL systems are coordinated together to utilize this now even larger overall area. With two LAPuSL systems coordinated together, the area covered is 2× minus the overlap area, if three systems areas are combined they can cover 3× minus the overlap area and so on. In this way larger and larger objects can be fabricated.

Object Produced by the Disclosed LAPuSL System

Figure 8A:
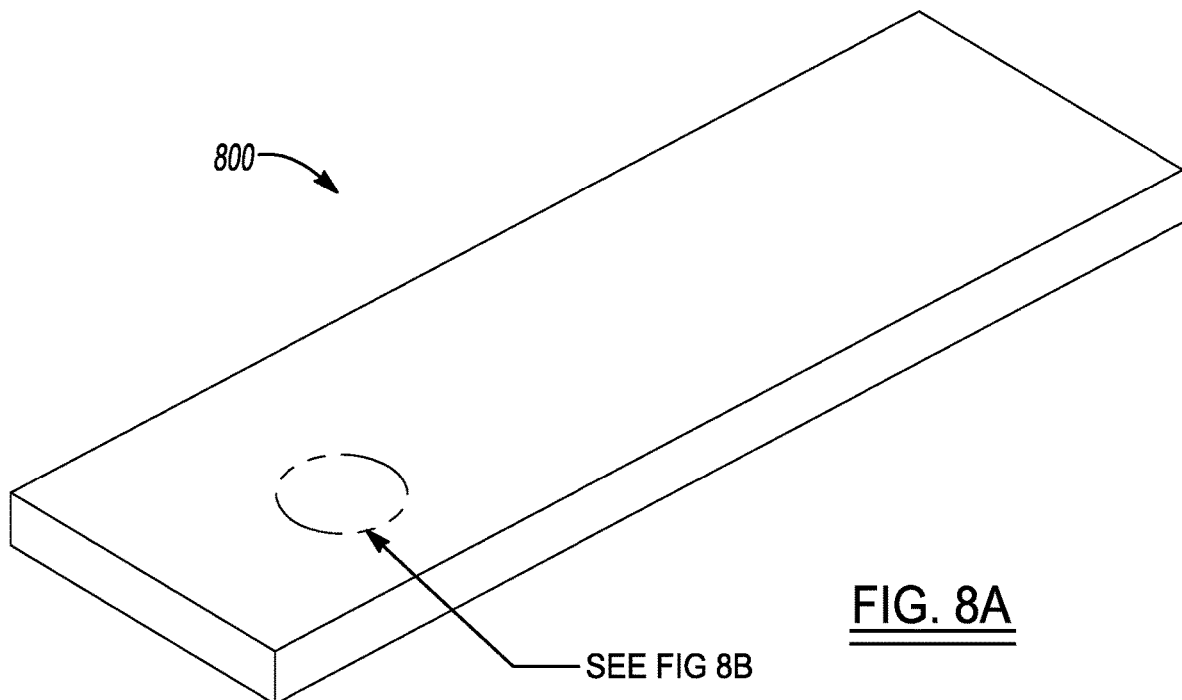
FIGS. 8A and 8B illustrate an object produced by the disclosed LAPuSL system.
Figure 8B:
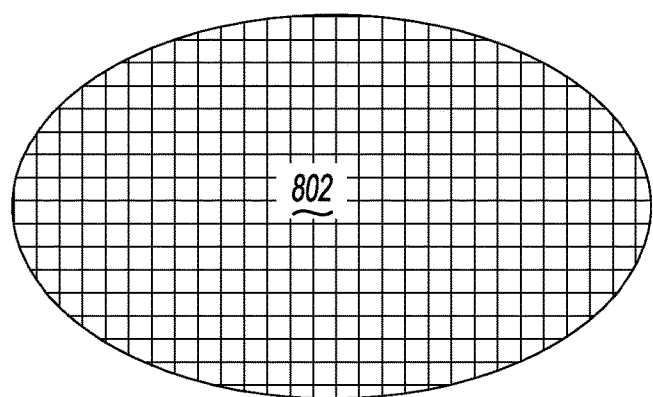

Referring now to FIGS. 8A and 8B, an object produced by the disclosed LAPuSL system is illustrated. The object is designated generally by the reference numeral 800. As illustrated in FIG. 8A, the object 800 can be tens to hundreds of millimeters in overall size with portions that are microns in size. An area 802 of the object 800 is shown enlarged in FIG. 8B. The area 802 shows that portions can be microns in size. The disclosed LAPuSL system has the ability to make objects which can be tens to hundreds of millimeters in overall size with features on the object that can be microns in size. There is no Prior Art system that can produce such objects practically or efficiently.

Metal or Ceramic Products

The disclosed apparatus and methods also provide a large area projection micro stereolithography system for producing a metal or ceramic product. The adjustable beam delivery system projects and scans the layer images to a curable resin containing metal or ceramic particles producing an object with a base polymer and metal or ceramic particles dispersed throughout the object. The base polymer is subsequently removed by thermal decomposition leaving behind the metal or ceramic product. This is further described in the article "Ultralight, Ultrastiff Mechanical Metamaterials" by Xiaoyu Zheng et al in *Science*, Vol. 344, Issue 6190, Jun. 20, 2014, pages 1373-1376; which is incorporated herein by this reference.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An area projection micro stereolithography method for producing a product from a three dimensional computer aided design model of the product, the method comprising the following steps:
   provide an addressable spatial light modulator;
   provide an optical system;
   provide a beam steering system;
   provide a curable resin bath;
   provide a build plane;
   provide an elevator system;
   generate a multiplicity of two-dimensional computer generated slices of the product from said three dimensional computer aided design model of the product, each one of said multiplicity of two-dimensional (2D) computer generated slices being further subdivided into a plurality of discrete but contiguous regions;
   for each said 2D computer generated slice, produce a plurality of unique images each corresponding uniquely to an associated one of said discrete regions of its associated said 2D computer generated slice;
   for a first one of said 2D computer generated slices:
      send said images of said discrete regions associated therewith to said spatial light modulator and said optical system and said beam steering system;
      use said spatial light modulator, said optical system and said beam steering system to optically steer said images to said corresponding locations in the build plane and create a continuous image on the build plane;
   wherein said continuous image is created by said beam steering system optically sending said images to said build plane without physically translating any one of said spatial light modulator, said optical system, said beam steering system, or said build plane, along an X axis or a Y axis of the build plane;
   use said elevator system to lower said build plane with said continuous image into said curable resin bath to provide a first completed slice of the product; and repeating sending the images for each one of said 2D generated computer slices to said spatial light modulator, in a layer-by-layer approach, to form additional completed ones of the 2D computer generated slices in a sequential fashion to complete the product.

2. A method for using projection micro stereolithography to produce a product, using a three dimensional computer aided design model of the product and a photo-curable resin residing within a resin bath, the method comprising:
   generating a multiplicity of two-dimensional (2D) computer generated slices of the product from said three dimensional computer aided design model of the product;
   dividing each one of said multiplicity of 2D slices into a plurality of discrete but contiguous regions 1-n formed along X and Y axes of a build plane;
   for a first one of said multiplicity of 2D slices performing operations "a" through "d" as follows:

a) performing a first operation including generating a first image uniquely associated with a first one of said contiguous regions, to be projected only to said first one of said contiguous regions;

b) performing a second operation including using a spatial light modulator to receive the first image and to generate an optical signal in accordance therewith;

c) performing a third operation including transmitting the optical signal to a beam steering system;

d) performing a fourth operation using the beam steering system to steer a beam including the optical signal to only the first one of the contiguous regions, to project the first image into a first subquantity of the resin and over only the first region, without translating movement of the beam steering system or the spatial light modulator along the X or Y axes of the build plane, and without translating movement of the build plane along the X or Y axes of the build plane, to preferentially cure at least a portion of the resin within only the first region; and repeating the operations a-d using unique additional images 2-n to sequentially generate, project and steer additional optical signals each being generated in accordance with an associated one of the unique additional images, in the resin and onto associated ones of the remaining discrete regions of the first 2D slice, such that the optical signals and the additional optical signals sequentially cure at least portions of the resin in each one of said discrete regions 2-n as the beam is steered to each of the regions 2-n, and without translating movement of the beam steering system or the spatial light modulator along the X or Y axes of the build plane, and without translating movement of the build plane along either one of the X or Y axes, to form a first layer of the product;

covering the first layer with an additional quantity of the resin in the resin bath; and repeating said first through fourth operations for a plurality of regions of each subsequent one of said multiplicity of 2D slices to form corresponding additional layers of the product without translating movement of the beam steering system or the spatial light modulator along the X or Y axes, and without translating movement of the build plane along the X or Y axes.

3. The method of claim 2, further comprising projecting said discrete regions 1-n of each one of said computer generated 2D slices onto said build plane such that adjacent pairs at least partially overlap one another.

* * * * *